March 31, 1931.   P. WIEGHARDT   1,798,826

APPARATUS FOR VULCANIZING TIRES AND OTHER RUBBER ARTICLES

Filed Feb. 9, 1928   2 Sheets-Sheet 1

PAUL WIEGHARDT
by Karl Viertel
Atty

March 31, 1931. P. WIEGHARDT 1,798,826
APPARATUS FOR VULCANIZING TIRES AND OTHER RUBBER ARTICLES
Filed Feb. 9, 1928 2 Sheets-Sheet 2

PAUL WIEGHARDT
by Karl Viertel
Atty

Patented Mar. 31, 1931

1,798,826

UNITED STATES PATENT OFFICE

PAUL WIEGHARDT, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

APPARATUS FOR VULCANIZING TIRES AND OTHER RUBBER ARTICLES

Application filed February 9, 1928, Serial No. 253,338, and in Germany November 14, 1927.

My invention relates to improvements in apparatus for vulcanizing tires of various kinds and other rubber articles, and more particularly to that type of vulcanizing apparatus comprising two molds each of which is steam jacketed and adapted to be opened and closed by means of a hinged lid and clamping members respectively.

The principal object of my invention is to provide an improved double mold vulcanizing apparatus the molds of which can be set into operation, charged and discharged both in horizontal and in vertical position so as to suit the operator's convenience or to comply with any local or temporary requirements.

Another object of this invention is to facilitate the operation of vulcanizing apparatus of the type concerned and more especially the supervision of the tubing and other appliances provided for conveying steam or any other heating fluid to the vulcanizing molds, and for simultaneously discharging the products of condensation, and of the means for charging compressed air or another compressed or heated fluid into the inner space of the articles under treatment, viz. while the molds are in horizontal or in vertical position.

The invention further aims at providing an improved double mold vulcanizing apparatus which is simple in its design, is composed of comparatively few parts which can be manufactured, worked and maintained at low cost, and which is easily applicable to tires of various shapes and sizes.

Other objects of my invention will appear in the following specification:

The nature and scope of my invention is briefly outlined in the appended claims and will be more fully understood with the aid of the accompanying drawing in which Fig. 1 is a vertical section through the vulcanizing molds;

Figure 7:
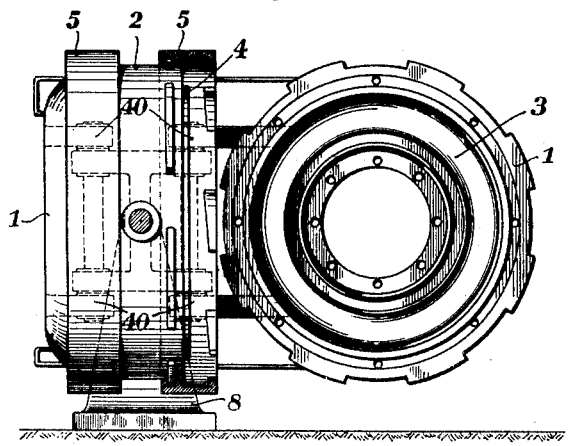
Fig. 7 is a side elevation of the apparatus partly in section, with one lid of the molds open and placed in vertical position.

The vulcanizing apparatus as shown in the drawings by way of an example consists of a double mold construction comprising two lids 1 which are hinged at 40 to a central housing 2 and are adapted to be sealed in closed position by means of clamping rings 5, the latter being capable of being swung around relatively to the housing 2 so as to engage or disengage respectively a number of flanges of the lids 1 by a kind of bayonet closure or a similar locking device as seen in Fig. 7.

The central housing of the apparatus is supported by a spindle terminating in journals 6 and 7 which are rotatably mounted in bearings 8, 9 of the main frame or base (not shown) of the apparatus.

Each of the molds proper comprises two members 3 and 4 which are rigidly held in their working position by the central housing 2 and the lids 1 respectively said housing and lids being designed so as to jointly form an enclosed heating chamber 10 which surrounds the molds.

A system of pipes and passages as described hereinafter serves for supplying the heating fluid—preferably steam—to the heating chamber and for discharging the condensed products of the heating fluid, said system of pipes and passages being so designed and arranged as to automatically keep the heating chamber in proper connection with the supply and discharge pipes independently of the position of the molds—may it be horizontal or vertical—and independently of the feature which of the two molds happens to be on the top of the other when both molds are in horizontal position.

As seen in Figs. 1–6, the heating fluid, supplied through a stationary ring 14 and a pipe 15, passes in the direction of the arrow (Fig. 4) through passages 12 and 17 provided in the journal 6, into a system of distributing pipes 20, 22, 24, 26 and 27 and thence into the three main compartments of the heating chamber while the condensed products concerned are discharged by a system of drain pipes 29, 27′, 31, 32, 21, and will pass in the direction of the arrow through passages 13 and 18 which are provided in the journal 6, into the discharge pipe 16.

Figure 1:
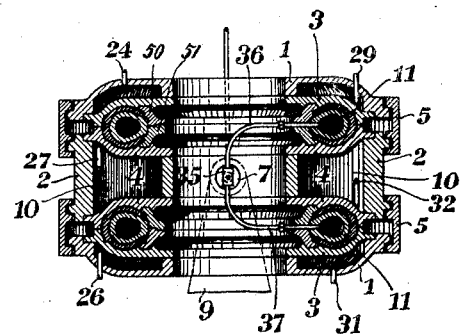
Figure 2:
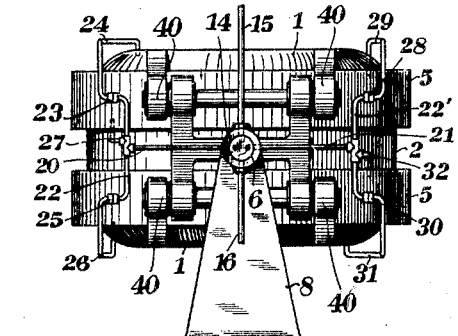
Fig. 2 is a side elevation of the apparatus.
Figure 3:
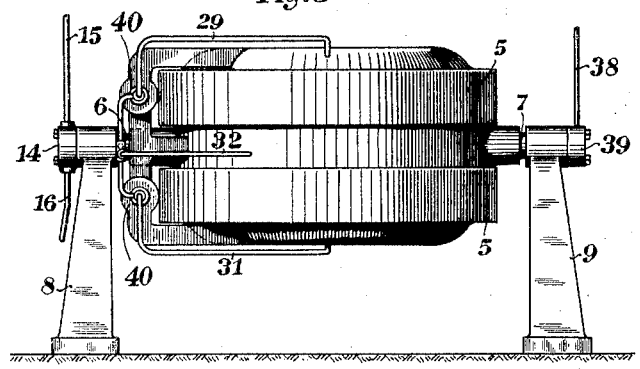
Fig. 3 is a front elevation of the same.
Figure 4:
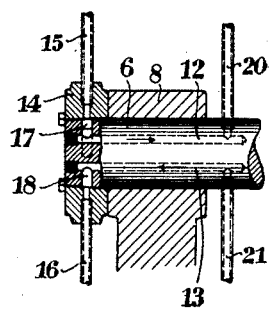
Figs. 4 to 6 show in a larger scale the ends of the main spindle of the apparatus partly in section and their connections with the various supply and discharge pipes.

It will be noted in Figs. 1 and 2 of the drawing that the distributing pipes 24, 26, 27 terminate in the upper part of the respective compartments of the heating chamber while the drain pipes 29, 31, 32 will drain the condensed products off the very bottom of the compartments concerned.

Attention is further drawn to the fact, that in turning the apparatus through an angle of 180° the horizontally disposed heating chamber will be automatically reconnected with the supply and discharge pipes 15 and 16 while the functions of the distributing pipes and of the drain pipes as referred to above are exchanged.

Figure 6:
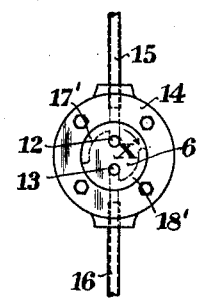

Means may be provided for automatically retaining the proper connections between the heating chamber and the supply and discharge pipes 15 and 16, even if the vulcanizing apparatus is turned into its vertical position:

Said means may comprise a pair of grooves or channels 17', 18' arranged at the outer circumference of the journal 6 and extending each through an angle of about 90°, as indicated in dotted lines in Fig. 6.

Rocker joints 23, 25, 28, 30 may be employed as fittings for connecting the distributing and drain pipes 24, 26, 29, 31 which lead to the heating compartments in the lids, said joints allowing for a swinging motion of the respective pipes whenever the lids 1 are to be opened or closed.

Figure 5:
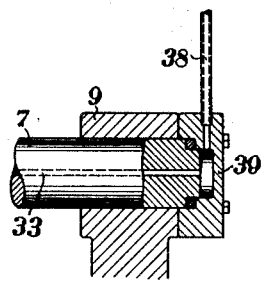

According to this invention the main spindle of the apparatus is provided with another longitudinal channel 33 terminating at the end of the journal 7 for conveying a compressed and preferably heated fluid such as hot compressed air to elastic air bags 11 which are to be put into contact with the inner walls of the tires under treatment and are held in position by clip rings 50, 51. The compressed fluid is supplied through a stationary pipe 38 and a lid 39, the latter tightly fitting over the end of the journal 7, and will then pass through a channel 33, a three-way connection 35 and tubes 36, 37 into the air bags 11 within the upper and lower mold respectively, as seen in Figs. 1 and 5.

Various changes and modifications may be made in the design of vulcanizing apparatus as described hereinbefore and in the cooperation of their component parts without substantially departing from the spirit and the salient ideas of this invention.

E. g. instead of a single channel 33 a pair of such channels may be longitudinally arranged within the main spindle, one of said channels serving for supplying a compressed fluid medium, the other one being available for conveying a heated medium to the respective air bags 11.

Another modification may consist in replacing the rigid distributing pipes and drain pipes, having rocker joint connections as described above, by flexible tubing adapted to be directly connected with and disconnected from the heating chambers of the molds whenever called for on turning the apparatus into another position.

Power driven or manually driven actuating devices may conveniently be employed for turning around the two vulcanizing units into any position required and for opening and closing the lids.

What I claim is:

1. In a vulcanizing apparatus for the purpose set forth the combination with two vulcanizing molds, arranged in a common housing, of a pair of journals attached to said housing and being rotatably mounted in stationary bearings, two channels being arranged within one of said journals interconnecting a steam supply pipe and an exhaust pipe respectively with a distributing and a draining pipe respectively attached to the heating chambers of the molds, another channel being provided within the second journal interconnecting a pipe for the supply of a compressed fluid with a three way valve and with pipes leading to air bags in the molds.

2. A vulcanizing apparatus having the features outlined in the preceding claim in which the journal having two longitudinal channels is provided at its outer end with two circumferential grooves, each of which extending through an angle of about 90°, so as to keep the said channels in connection with the steam pipe and the exhaust pipe respectively, whenever the molds are turned from their horizontal into their vertical position or vice-versa.

The foregoing specification signed at Berlin this 18th day of January, 1928.

PAUL WIEGHARDT.